J. F. JOHNSON.
PLANTING DEVICE.
APPLICATION FILED JUNE 26, 1911.
1,011,205. Patented Dec. 12, 1911.
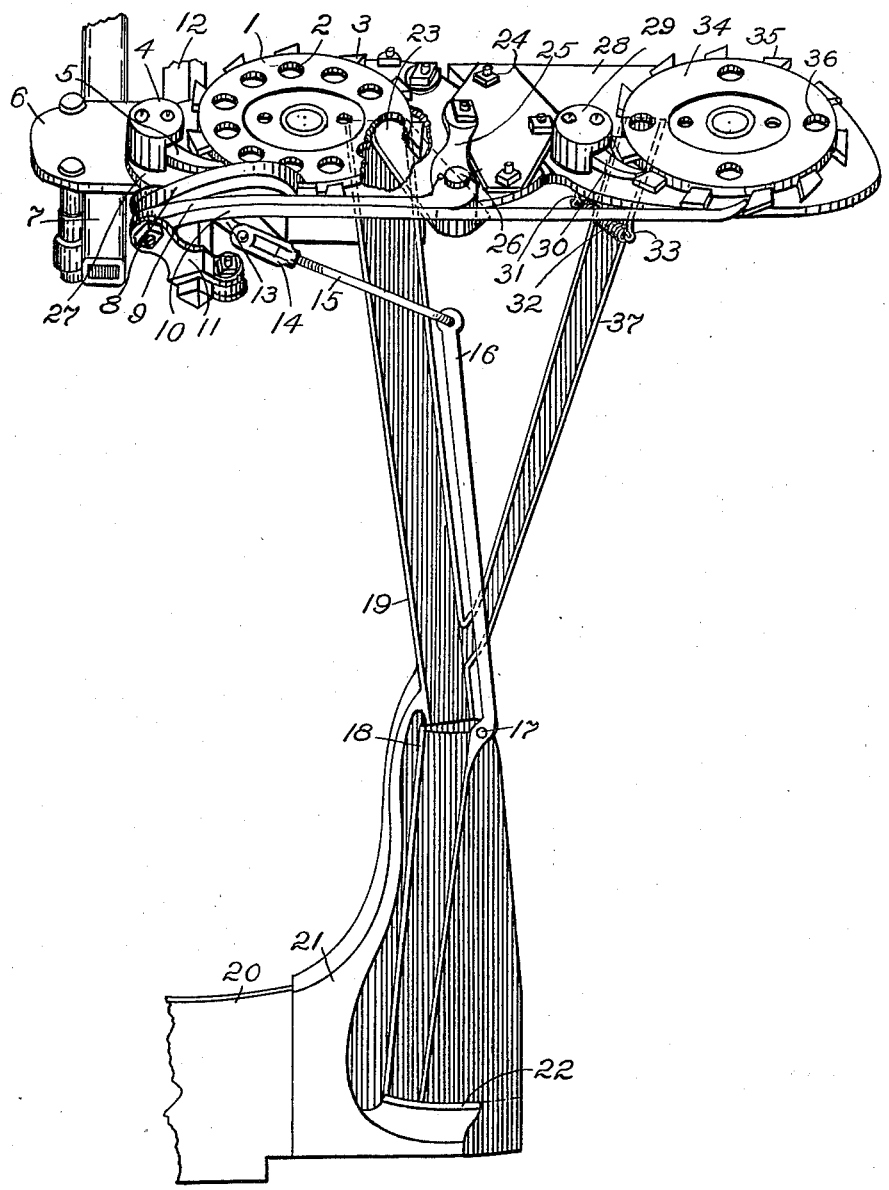
Witnesses:
E. C. Jennings.
N. P. Hovie
Inventor,
John F. Johnson, by
By G. C. Kennedy.
Attorney.

UNITED STATES PATENT OFFICE.

JOHN F. JOHNSON, OF ROWLEY, IOWA.

PLANTING DEVICE.

1,011,205.  Specification of Letters Patent. Patented Dec. 12, 1911.

Application filed June 26, 1911. Serial No. 635,471.

*To all whom it may concern:*

Be it known that I, JOHN F. JOHNSON, a citizen of the United States of America, and a resident of Rowley, Buchanan county, Iowa, have invented certain new and useful Improvements in Planting Devices, of which the following is a specification.

My invention relates to improvements in planting devices, and the object of my improvement is to provide means adapted to coöperate with the seeding mechanism of a corn planter or other similar device adapted to permit the interpolation in certain of the deposits of seed of other seed of a different kind as desired, with provision whereby the ratio of the interpolated deposits to the others may be varied. This object I have accomplished by the mechanism which is hereinafter described and claimed, and which is illustrated in the accompanying drawing, in which the figure represents my invention as combined and coöperating with the dropping mechanism of a corn-planter, with parts sectioned away to better disclose the interior construction, the dropping mechanism alone being shown with auixiliary parts removed or broken away.

The numeral 27 designates a plate having a bracket 6 clamped to a supporting cross-bar 7. On said plate a ratchet-wheel 1 is rotatably mounted whose ratchets 3 are movably engaged by a driving-pawl 8, and by a guard-pawl 5, the latter being pivoted in a housing 4 and kept in contact with said wheel by means of a spring (not shown). A similar ratchet-wheel 34 is rotatably mounted on a plate 28 secured to the other plate, and its teeth 35 are likewise engaged by a driving-pawl 10 and by a guard-pawl 30, the latter being pivoted in a like housing 29 and kept in contact with said wheel by means of another spring (not shown). Both of the driving-pawls 8 and 10 are pivoted on the same pintle between crank-arms 11 fixed on a rock-shaft 12, the latter being rocked by any desired means. The driving-pawl 10 is kept in operative contact with the teeth of the wheel 34 by means of a coiled tension spring 32 connected between pins 33 and 31 on said pawl and the plate 28 respectively.

The ratchet-wheel 1 has a desired number, in this case eleven, of vertical openings 2 equally arranged concentrically about its axis, while the other ratchet-wheel 34 has a different number of similar orifices 36, in this case the number is four, arranged concentrically about its axis. I have not shown in the drawing a view of the separate seed-containing cans, one for each wheel 1 and 34, nor the auxiliary means commonly used to divert seed to and retain it in said orifices 2 and 36 until wanted. Seed deposited in said orifices 2 and 36, are retained respectively therein during the rotation of said wheels, until they come successively over ports in the said plates under the wheels. One of such ports leads into a nearly vertical conduit-pipe 19, while the other port leads from the wheel 34 to a conduit-pipe 37 which is inclined obliquely toward and empties at an angle into the other pipe 19. There is no obstruction in said pipe 37 to the passage of seed therethrough from the wheel-orifice 36 in registration with it to the opening into the pipe 19, but the passage of seed through the main-pipe 19 is periodically obstructed momentarily by the following means.

The numeral 23 designates a sliding-plate projecting from the lower side of a lever 25, the latter being pivoted to the top of the plate 27 on a stud 24. The plate 23 is on the under side of the plate 27 and is slidably movable at its vertical junction with said arm over a curved or arc-shaped part of the edge of the plate 27. The said lever-arm is pivoted to an end of the arm 9 on a stud or pintle 26, and the arm 9 has its other end pivoted on the pintle in the crank-arms 11, on which said driving-pawls are mounted. The action of the arm 9 forward and back on the lever 25 is such as to alternately move the slide 23 to cover and uncover the under side of the orifice 2 in the superincumbent wheel 1, it being understood that seed which has been deposited in said orifices remain therein being pushed along over the top of the plate 27 till they arrive in the port in said plate.

At the lower end of the conduit-pipe 19 is a movable or swinging conduit 18 in direct communication therewith, pivoted on a pintle 17 in the frame hanger 21, the latter carrying the planter-shoe 20. The lower end of the swinging-part 18 is movable over a shelf 22 when moved or swung in one direction, closing it, but when the part is swung in the opposite direction, the seed therein may fall out into the furrow below. The swinging-conduit 18 has an integral upwardly-projecting arm 16, and a two-part adjustable link 14—15 connects said arm 16 with the end of a crank-arm 13 on the rock-shaft 12. When the rock-shaft actuates both the wheels 1 and 34, also the slide-plate 23, and the swinging-conduit 18, the operation produces the following action upon seeds placed respectively in the orifices 2 and 36 of said wheels.

Seed, such as kernels of corn, being deposited in the orifices 2 of the wheel 1, are carried around it, and are deposited successively in the port thereunder in the plate 27, and are held in said port on top of the slide-plate 23 until the latter is moved by above-described means out of the conduit 19. When the slide 23 is moved to one side the said port is freed, which permits the charge of seed therein to traverse said conduit downwardly till stopped at the bottom of the swinging communicating conduit-part 18 by the stop 22. The return swing of the part 18 shoves the seed off the stop shelf 22 into the furrow. Since the other wheel 34 is rotated synchronously with the wheel 1 by the above described means, seed of a different kind, such as pumpkin or bean seed, is deposited in the orifices 36 of said wheel, and carried along over the plate 28 to the said port in the plate, whence, there being no obstruction, they are shot down through the oblique conduit 37 to the conduit 19, and into its communicating part 18. Since the conduit 37 is a little longer than the conduit-part 19 above the junction of the two, and since a retardation of the seed occurs in passing from the conduit 37 at an angle with the conduit 19, the resultant effect is to conduct the seed from the wheel 34 to the deposit or stop-plate 22 in the same time, insuring the mixture of both kinds of seed in one charge on said stop-plate 22.

As will have been observed, the wheels 1 and 34 are provided with a different ratio of orifices in number, and since the wheels are removable, others may be substituted at any time for them, providing a different ratio between them, as desired. In the illustrated present instance, I have shown one wheel provided with eleven holes while the other has but four distributing holes, but since the wheels are rotated synchronously, and the holes are suitably located relative to each other, the contents of the holes are so dropped, that the seed in the wheel 34 are dropped in four of the places which are seeded by the other wheel. The result is this, that seeds of different species may be sown together at one operation, and the parts may be substituted to vary the ratio of difference in dropping.

The action of the device is rapid, sure and uniform, and the attachment may be easily added to any planter of this type.

Having described my invention, what I claim as new, and desire to secure by Letters Patent, is:

In combination, a supporting body, a rotatable body provided with a certain plurality of concentric orifices, said body having a port under and in the path of said orifices and adapted to receive seed from each singly and successively, another rotatable body provided with a number of concentric orifices, said supporting body being provided with a port under and in the path of the orifices of the second-mentioned rotatable body adapted to receive seed from said orifices singly and successively, means for synchronously rotating said rotatable bodies, a conduit in communication with the first-mentioned port, means for interrupting the passage of said conduit at regular intervals, a conduit extending from the second-mentioned port to the first-mentioned conduit below said interrupting means, communicating with each and delivering into the first-mentioned conduit at an angle thereto, a movable conduit in communication with said first-mentioned conduit at its delivery-end, and means for interrupting the passage of said last-mentioned conduit at regular intervals.

Signed at Rowley, Iowa, this 13th day of June, 1911.

JOHN F. JOHNSON.

Witnesses:
  Roy R. Ossman,
  F. F. Weiher.

Copies of this patent may be obtained for five cents each, by addressing the "Commissioner of Patents, Washington, D. C."